United States Patent [19]

Acharya et al.

[11] Patent Number: 5,728,198
[45] Date of Patent: Mar. 17, 1998

[54] PROCESS AND APPARATUS FOR GAS PURIFICATION

[75] Inventors: Divyanshu R. Acharya; Ravi Jain, both of Bridgewater; James K. Tseng, Berkeley Heights, all of N.J.

[73] Assignee: The BOC Group, Inc., New Providence, N.J.

[21] Appl. No.: 722,687

[22] Filed: Sep. 30, 1996

[51] Int. Cl.⁶ .................. B01D 53/04; B01D 53/26
[52] U.S. Cl. ................... 95/114; 95/123; 95/126; 95/139
[58] Field of Search .................. 95/98, 102, 105, 95/114, 117–126, 130, 139; 96/130–132

[56] References Cited

U.S. PATENT DOCUMENTS

| | | | |
|---|---|---|---|
| 3,161,488 | 12/1964 | Eastwood et al. | 95/118 X |
| 3,237,379 | 3/1966 | Kant et al. | 95/98 |
| 3,594,984 | 7/1971 | Toyama et al. | 95/126 |
| 4,233,038 | 11/1980 | Tao | 95/125 X |
| 4,249,915 | 2/1981 | Sircar et al. | 95/122 X |
| 4,541,851 | 9/1985 | Bosquain et al. | 96/126 |
| 4,698,072 | 10/1987 | Rohde et al. | 95/119 |
| 4,711,645 | 12/1987 | Kumar | 95/98 |
| 4,874,525 | 10/1989 | Markovs | 95/123 X |
| 4,950,311 | 8/1990 | White, Jr. | 95/98 |
| 4,964,888 | 10/1990 | Miller | 95/95 |
| 5,110,569 | 5/1992 | Jain | 95/123 X |
| 5,198,001 | 3/1993 | Knebel et al. | 95/126 X |
| 5,202,096 | 4/1993 | Jain | 95/123 X |
| 5,232,474 | 8/1993 | Jain | 95/98 X |
| 5,232,479 | 8/1993 | Poteau et al. | 96/131 |
| 5,443,623 | 8/1995 | Jonas et al. | 95/105 X |
| 5,447,558 | 9/1995 | Acharya | 95/122 X |
| 5,531,809 | 7/1996 | Golden et al. | 95/105 X |
| 5,593,475 | 1/1997 | Minh | 95/123 |

FOREIGN PATENT DOCUMENTS

| | | | |
|---|---|---|---|
| 2627327 | 11/1977 | Germany | 95/118 |
| 55-137026 | 10/1980 | Japan | 95/122 |
| 59-004415 | 6/1982 | Japan . | |
| 61-029768 | 7/1986 | Japan | 95/117 |
| 1068150 | 1/1984 | U.S.S.R. | 95/119 |
| 1380764 | 3/1988 | U.S.S.R. | 95/105 |
| 2055609 | 3/1981 | United Kingdom | 95/105 |
| 0 449 576 | 3/1991 | United Kingdom . | |

*Primary Examiner*—Robert Spitzer
*Attorney, Agent, or Firm*—Coleman R. Reap; Salvatore P. Pace

[57] ABSTRACT

An air prepurification system which includes vertically oriented adsorption vessels containing, from top to bottom, a layer of moisture-selective adsorbent, a first layer of carbon dioxide-selective adsorbent and a second layer of carbon dioxide-selective adsorbent wherein the particle size of carbon dioxide-selective adsorbent in the second layer of carbon dioxide-selective adsorbent is smaller than the particle size of both the moisture-selective adsorbent and the carbon dioxide-selective adsorbent in the first layer of carbon dioxide-selective adsorbent. The air purification system is designed for use in a temperature swing adsorption process in which air is passed downwardly through the adsorption vessels during the adsorption step and upwardly through the vessels during the adsorbent regeneration step.

17 Claims, 2 Drawing Sheets

PROCESS AND APPARATUS FOR GAS PURIFICATION

FIELD OF THE INVENTION

This invention relates to the purification of gases by a cyclic adsorption process, and more particularly to the removal from a gas stream of a selected component of the gas stream by temperature swing adsorption (TSA) in one or more adsorption vessels each containing two or more layers of an adsorbent that is selective for the selected component, and wherein the particle size of the adsorbent in one layer is larger than the particle size of the adsorbent in another layer.

BACKGROUND OF THE INVENTION

When oxygen, nitrogen and argon product gases are produced by fractional distillation of air at cryogenic temperatures it is necessary to remove substantially all of the moisture and carbon dioxide from the air feed to the distillation plant; otherwise these components would freeze in the heat exchangers and other equipment of the plant, and eventually prevent the flow of the feed air through the equipment. The removal of water vapor and carbon dioxide from the feed air is commonly accomplished by passing the feed air through a TSA-based prepurification unit (PPU) comprising one or more beds of adsorbent that selectively adsorb these components. As the demand for oxygen, nitrogen and argon increases, larger air separation plants are being constructed, and to accommodate the higher capacity of the larger plants it is necessary to construct larger PPUs. Conventional vertical PPUs no longer remain economical, and the use of horizontal vessels becomes necessary. Horizontal vessels require larger bed areas and create problems with internal gas flow distribution, and they are usually considered to be more complex to design and operate. There is, therefore, a great deal of incentive to increase the maximum throughput of conventional vertical vessels.

The capacity of an adsorption bed of given cross-section and bed depth is directly proportional to both the velocity of gas passing through the bed and the effectiveness of the adsorbent in the bed. All other factors being equal, increasing the velocity of gas flow through the bed will increase the volume of gas purified. The velocity of gas flow through the bed also affects the pressure drop across the bed, such that increasing the gas velocity will cause an increase in the pressure drop across the bed. The maximum velocity through a fixed bed in downflow mode will depend upon the crush strength of the adsorbent. The gas velocity through the adsorbent cannot be increased to the point that the pressure drop is so great that the adsorbent begins to crumble.

The upward gas velocity through a bed of adsorbent is limited by a second constraint: the minimum fluidization velocity of the adsorbent. This is the gas velocity which causes the particles of adsorbent to rise and move within the bed. Movement of the adsorbent particles in the bed is undesirable since this causes attrition of the adsorbent, which dramatically shortens the useful life of the adsorbent. To avoid excessive adsorbent attrition, a fixed bed adsorption unit is never operated under conditions which cause fluidization of the adsorbent in the bed.

The effectiveness of the adsorbent is inversely proportional to the particle size of the adsorbent. Decreasing the particle size of the adsorbent results in increased effectiveness of the adsorbent. However, decreasing the particle size of the adsorbent also causes an increase in the pressure drop across the bed. Decreasing the adsorbent particle size also lowers the minimum fluidization velocity of the adsorbent.

In conventional adsorption processes the flow of feed gas through the adsorbent is upwardly during the adsorption step and downwardly during the bed regeneration. In many instances, since gas flow through a bed during the adsorption step is considerably greater than gas flow through the bed during bed regeneration, the minimum fluidization velocity constraint directly affects the size of the adsorption vessel used in conventional adsorption processes.

The present invention provides a method of increasing the capacity of an adsorption unit without increasing the size of the unit, or reducing the size of the unit while obtaining the same duty. This is accomplished by using a combination of beds of different sized adsorbent in the adsorption unit and by reversing the flow of feed gas and bed regeneration purge gas through the beds, relative to the conventional flow pattern. It is known to conduct cyclic adsorption processes using a multiple-layer adsorption system with downflow during the adsorption step and upflow during the regeneration step wherein the particle size of the adsorbent in the lower layer is smaller than the particle size of the adsorbent in the upper layer.

European Patent Application No. 449 576 A1 discloses a conventional upflow PPU adsorption process in which the adsorbent comprises an upper layer of fine adsorbent and a lower layer of coarse adsorbent. The disclosure of this patent is incorporated herein by reference. Bosquain et al., U.S. Pat. No. 4,541,851 discloses a radial flow adsorption bed containing adsorbent particles of different sizes. Japanese Kokai Sho 59-4415 (1984) teaches the use of adsorbent of different particle sizes in the same vessel. Miller, U.S. Pat. No. 4,964,888 also discloses a PSA process using adsorbents of different particle sizes.

SUMMARY OF THE INVENTION

The invention comprises a process for purifying a gas stream by adsorption in an adsorption unit containing an upper layer of coarse particle sized adsorbent and a lower layer of fine particle sized adsorbent, and wherein the feed gas flows downwardly through the adsorption unit during the adsorption step of the cycle and the purge gas flows upwardly through the unit during the bed regeneration step.

The invention comprises a cyclical process for the separation of a first component of a gas mixture from a second component of the gas mixture comprising the steps:

(a) passing the gas mixture downwardly through an adsorption vessel at superatmospheric pressure, the vessel having at least two layers of first component-selective particulate adsorbent, including a first layer of first component-selective adsorbent and, positioned below the first layer, a second layer of first component-selective adsorbent, the average particle size of adsorbent in the first layer being greater than the average particle size of adsorbent in the second layer, and withdrawing first component-depleted gas from the bottom of the vessel; and (b) passing a first component-lean purge gas upwardly through said vessel at a linear velocity less than the minimum fluidization velocity of the adsorbent in the uppermost layer of adsorbent but not less than the minimum fluidization velocity of the adsorbent in said second layer of adsorbent in said vessel; and withdrawing first component-enriched gas from the top of the vessel.

In a preferred aspect of this embodiment the adsorption process is TSA.

In one aspect of this embodiment the above-mentioned first layer of adsorbent is the uppermost layer of adsorbent in the vessel.

In another preferred aspect of this embodiment, the gas mixture being purified is air and the above-noted first component is carbon dioxide. In this preferred embodiment, the adsorbent in the first and second layers is a zeolite.

In another aspect of the invention, the vessel in which the adsorption process is carried out contains a layer of moisture-selective adsorbent positioned above the above-mentioned first layer of adsorbent. In a preferred version of this aspect, the moisture selective adsorbent is silica gel, alumina, zeolite 3A or mixtures of these. In a most preferred aspect of this embodiment, the adsorbent in the above-mentioned first and second layers is zeolite 5A, zeolite 13X, calcium-exchanged type X zeolite or mixtures of these.

In another preferred embodiment the process of the invention is carried out in a plurality of adsorption vessels operated out of phase such that step (a), above, is carried out in one adsorption vessel while step (b), above, is being carried out in another vessel. In a preferred aspect of this embodiment, substantially all of the adsorbent in the first layer of adsorbent has a particle size in the range of about 2 to about 10 mm and substantially all of the adsorbent is the second layer of adsorbent has a particle size in the range of about 1 to about 5 mm. In a more preferred aspect of this embodiment, substantially all of the moisture-selective adsorbent has a particle size in the range of about 3 to about 12 mm.

In a more preferred embodiment of the process of the invention, substantially all of the moisture-selective adsorbent has a particle size in the range of about 5 to about 8 mm, substantially all of the adsorbent in the first layer of adsorbent has a particle size in the range of about 2 to about 6 mm and substantially all of the adsorbent in the second layer of adsorbent has a particle size in the range of about 1 to about 3 mm.

In a preferred embodiment of the process of the invention, the first component-lean purge gas is passed upwardly through the vessel during step (b) at a linear velocity in the range of about 0.1 to about 1 meter per second.

In a preferred aspect of the process embodiment of the invention, the adsorbent in the upper layer of first component-selective adsorbent and the adsorbent in the lower layer of first component-selective adsorbent are the same adsorbent.

In other preferred embodiments of the invention the gas mixture is passed downwardly through the vessel at a pressure in the range of about 2 to about 20 bara; the particle size of the adsorbent in the uppermost layer of adsorbent in the adsorption vessel is at least 120% the particle size of the adsorbent in the second layer; and the adsorption vessel is a vertical adsorption vessel.

BRIEF DESCRIPTION OF THE DRAWINGS

Like reference characters are used in the various figures to designate like parts of the same equipment units. Only equipment, valves and lines that are necessary for an understanding of the invention have been included in the drawing figures.

DETAILED DESCRIPTION OF THE INVENTION

The invention takes advantage of: several gas flow characteristics in vertical fixed beds of particle adsorbent during cyclic gas adsorption processes. These include (1) the fact that the volume of purge gas flowing through an adsorption bed during the bed regeneration step of a cyclic adsorption process can be much lower than the volume of feed gas flowing through the bed during the adsorption step; (2) the fact that the downward velocity of gas through a specific adsorption bed can be much greater than the minimum bed fluidization velocity of gas flowing upwardly through the bed; (3) a bed of large particles of a given adsorbent have a higher minimum fluidization velocity than a bed of small particles of the same adsorbent; and (4) small particles of a given adsorbent more effectively adsorb a gas than large particles of the same adsorbent. The invention also takes advantage of an experimental observation (described later) that when a layer of large particles is placed on top of a layer of small particles in a vessel, linear velocity in the upward direction through the layers can be higher than the minimum fluidization velocity of the small particles without causing the combined bed to fluidize. The linear velocity still has to be lower than the minimum fluidization velocity of the large particles.

The increased capacity of the system of the invention is achieved by packing fine particle size adsorbent in the lower sections of vertical adsorption beds of an adsorption system and coarse particle adsorbent in the upper sections of the beds of the system, and by flowing feed gas downwardly through the vertical adsorption beds during the adsorption step of a cyclical adsorption process and flowing purge gas upwardly through the beds during the bed regeneration step of the process.

Figure 1:
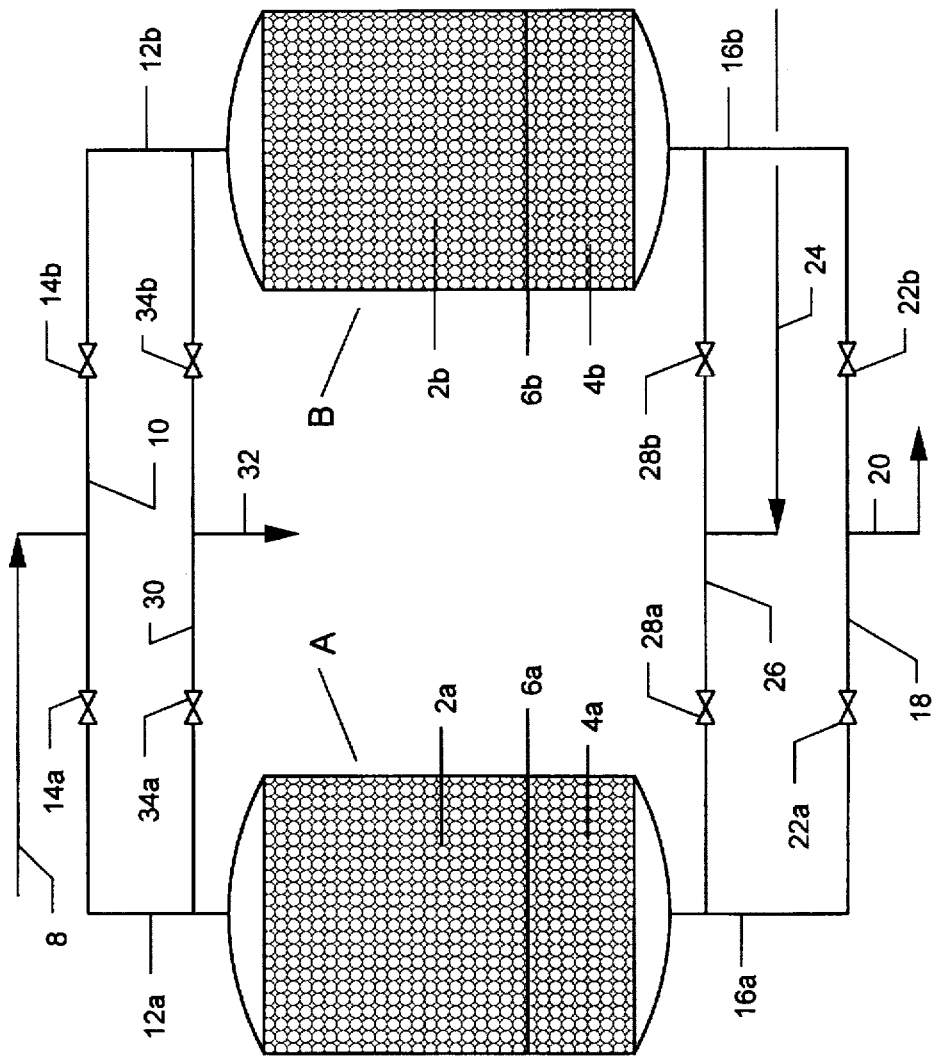
FIG. 1 illustrates a schematic representation of a system in which a first embodiment of the invention can be carried out.

The invention can be more fully understood from the following description taken in connection with the appended drawings. Turning now to FIG. 1 of the drawings, there is shown therein a two vessel adsorption system comprised of adsorption vessels A and B. The system is equipped with piping and valving to permit the adsorption vessels of the system to be operated in parallel and out of phase, such that the adsorbent in one vessel is in adsorption service while the adsorbent in the other vessel is undergoing regeneration. The system can be used to remove any adsorbable gas impurities from a generally nonadsorbable gas stream, however it will be described as it is used to remove carbon dioxide and moisture from air. Vessels A and B are packed with upper layers $2a$ and $2b$, respectively, of identical water vapor- and carbon dioxide-adsorbent and with lower layers $4a$ and $4b$, respectively, of identical water vapor-and carbon dioxide-selective adsorbent. As indicated in FIG. 1, the adsorbent in layers $2a$ and $2b$ is larger than that in layers $4a$ and $4b$. Beds $2a$ and $4a$ and beds $2b$ and $4b$ may be separated by screens $6a$ and $6b$, if desired. Screens $6a$ and $6b$ are not fastened to the interior walls of vessels A and B but simply lie on top of layers $4a$ and $4b$.

Feed gas is introduced into the system of FIG. 1 through inlet line 8 which, on its downstream end, is joined to inlet gas manifold 10. Manifold 10 is connected to vessel inlet lines $12a$ and $12b$, which are, in turn, connected to the inlet ends of vessels A and B, respectively. Manifold 10 contains valves $14a$ and $14b$ which control flow between lines 8 and $12a$ and between lines 8 and $12b$, respectively. The nonadsorbed gas outlet ends of vessels A and B are connected to vessel outlet lines $16a$ and $16b$, respectively. The downstream ends of lines $16a$ and $16b$ are connected to product gas manifold 18. Manifold 18 is connected to product gas discharge line 20. Flow between lines $16a$ and 20 and between lines $16b$ and 20 is controlled by valves $22a$ and $22b$, respectively, each of which are located in manifold 18. Purge gas inlet line 24 is connected to purge gas inlet manifold 26 which, in turn, is connected to lines 16a and 16b. Manifold 26 is provided with valves 28a and 28b, which control flow between lines 24 and 16a and between lines 24 and 16b, respectively. Inlet lines 12a and 12b are connected to purged gas outlet manifold 30 which, in turn, is connected to vent line 32. Manifold 30 is also provided with valves 34a and 34b, which control flow of gas between lines 12a and 32 and between lines 12b and 32, respectively.

The process can be used to remove any strongly adsorbed impurities from a gas stream comprised of a relatively weakly adsorbed gas. However, it will be described as it applies to the prepurification of air, i.e. the removal of water vapor and carbon dioxide from the air, by TSA in a two unit adsorption system operated 180° out of phase, such that one unit is in adsorption service while the other unit is being regenerated.

In the first half-cycle of the process the adsorbent in unit A is in the adsorption mode and the adsorbent in unit B is being regenerated, and in the second half-cycle the adsorbent in unit B is in the adsorption mode and the adsorbent in unit A is being regenerated. In the first half cycle valves 14a, 22a, 28b and 34b are open and all other valves are closed.

In practicing the process of the invention in the system illustrated in FIG. 1, ambient air is introduced into the system via line 8. The air feed gas stream may pass through a compressor (not shown) wherein the gas is compressed to a pressure up to, for example, about 10 bara. The compressed air feed gas stream can then be passed through a heat exchanger (not shown) wherein it is cooled sufficiently to condense some of the moisture that may be contained in the gas stream. The cooled gas stream can then be passed through a water separator (not shown) to remove liquid water therefrom. These preliminary units are not shown because their use is optional and depends upon the quality of the inert gas feed stream. The feed gas stream, now usually at a temperature in the range of about 5° to about 50° C., enters manifold 10.

The compressed feed gas next passes through manifold 10 and line 12a and into vessel A. The gas passes downwardly through the beds of adsorbent in vessel A, generally at a linear velocity of about 0.1 to about 1 meters per second (mps). This velocity can be greater than the minimum fluidization velocity of the adsorbent in layer 4a; however, since flow of the gas through vessel A is downwardly and layer 4a is at the bottom of vessel A, the adsorbent in layer 4a will not be fluidized. As the feed gas passes through vessel A in the early stage of the half-cycle substantially all of the moisture and carbon dioxide will be adsorbed in layer 2a. The mass transfer zone in layer 2a will be relatively large, however, because of the large size of the adsorbent in layer 2a. As the half-cycle proceeds, layer 2a will become more and more saturated with water vapor and carbon dioxide and the adsorption front will approach and enter layer 4a. Eventually layer 2a becomes fully saturated with water vapor and carbon dioxide. At this point the mass transfer zone moves entirely into layer 4a. Since the particle size of the adsorbent in layer 4a is smaller than that of the adsorbent in layer 2a, the adsorbent in layer 4a will be more efficient than that in layer 2a; accordingly, the mass transfer zone in layer 4a will be shorter than it was in layer 2a. Thus, the adsorbent will be more fully utilized than it would be if vessel A contained only one layer of large sized adsorbent. Furthermore, since the particle size of the adsorbent in layer 2a is relatively large, the pressure drop in this layer will be lower than if the entire bed were composed of small particle size adsorbent. The large particle size of the adsorbent in layer 2a does not adversely affect the efficiency of the process in the final stage of the half-cycle, since during the final stage layer 2a is in the equilibrium state.

During this half-cycle of the process the adsorbent in vessel B undergoes regeneration. This is accomplished by passing a purge gas that contains very little or no water vapor or carbon dioxide upwardly through vessel B at a linear velocity in the range of about 0.1 to about 1 mps. This velocity can be above the minimum fluidization velocity of the adsorbent in layer 4a but it is not as great as the minimum fluidization velocity of the adsorbent in layer 2a. Again, fluidization of the adsorbent in layer 4a is avoided because layer 4a is restrained from fluidization by layer 2a.

A suitable gas for use as a purge gas is the prepurified air product gas from the system or one of the waste gas streams from the downstream air separation plant. The purge gas is heated by gas heating means (not shown), generally to a temperature in the range of about 75° to about 300° C., prior to its introduction into vessel B. The heated purge gas enters the system through line 24 and passes through line 16b and into vessel B. As the hot purge gas passes upwardly through the layers of adsorbent in vessel B, water vapor and carbon dioxide are desorbed from the adsorbent. The desorbed water vapor and carbon dioxide, together with the purge gas, pass out of vessel B through lines 12b and 32 and are vented to the atmosphere.

The purge gas can be passed through vessel B at a greater linear velocity than would be the case if the position of layers 2b and 4b were reversed. The mode of operation in this invention permits the use of smaller diameter adsorbent than must be used in the conventional mode of operation. There is no danger of reaching the minimum fluidization velocity of the adsorbent in layer 2b because of its large size. Thus, because the coarser adsorbent is above the finer adsorbent, when fluid flow is in the upward direction, smaller diameter adsorbent can be used than in currently practiced bed regeneration procedures.

When regeneration of the adsorbent in vessel B is finished, the heater is turned off and cool purge gas that contains very little or no water vapor and carbon dioxide is passed through the adsorbent in vessel B until the adsorbent is cooled to the desired extent.

At a predetermined point in the first half-cycle, determined usually when the adsorption front in layer 4a reaches a certain point in that zone, the first half-cycle is terminated and the second half cycle is begun. At this point, valves 14b, 22b, 28a and 34a are opened and all other valves are closed.

The second half-cycle of the process is identical to the first half cycle except that the phases conducted in vessels A and B are reversed, such that, in the second half-cycle, the adsorbent in vessel B is in purification service and the adsorbent in vessel A is regenerated in the manner described above.

Figure 2:
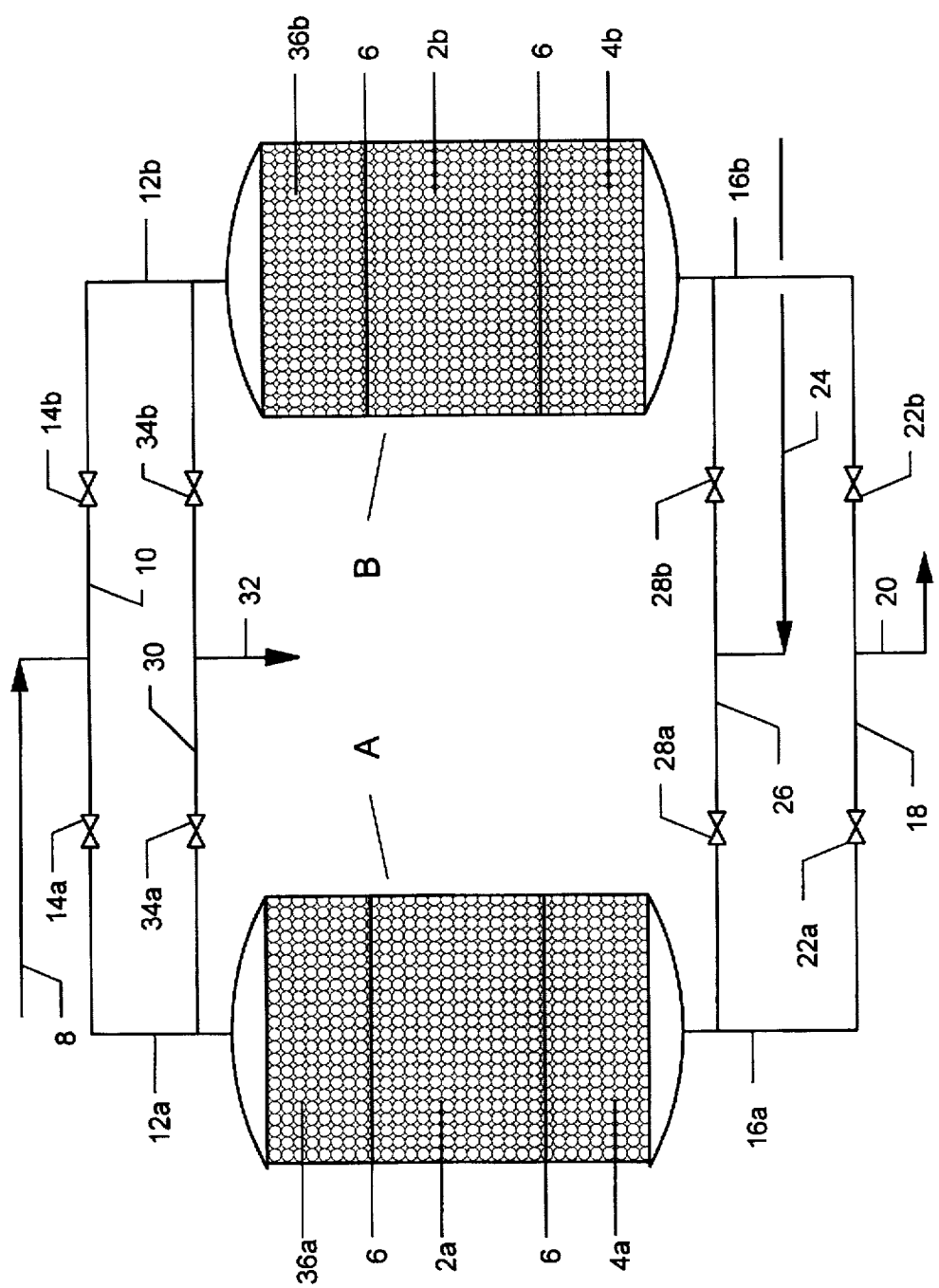
FIG. 2 is a schematic representation of a system in which a second embodiment of the invention can be carried out.

The system of FIG. 2 is similar to that of FIG. 1 except that desiccant layers 36a and 36b are positioned in vessels A and B, respectively, above layers 2a and 2b. As was the case in the FIG. 1 system screens 6 can be placed between layers 36a and 2a and between 36b and 2b, if desired. The desiccant in layers 36a and 36b can be any adsorbent which more rapidly adsorbs water vapor than other components of the gas stream. Typical desiccants include silica gel, activated alumina, type A zeolite and type X zeolite. Preferred desiccants include silica gel, activated alumina and zeolite 3A.

The system of FIG. 2 takes advantage of the fact that water vapor is very rapidly adsorbed, even on adsorbent which has a very large particle size. Thus the particle size of the adsorbent in layers 36a and 36b can be as large as or larger than the particle size of the adsorbent in layers 2a and 2b. Typically the particle size of the adsorbent in layers 36a and 36b is in the range of about 3 to about 12 mm, and it is preferably in the range of about 5 to about 8 mm. The particle size of the adsorbent in layers 2a, 2b, 4a and 4b are the same as they were in the system of FIG. 1.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

Multiple-layer adsorption vessels for removing carbon dioxide from an air stream based on several flow schemes are designed. The designs are based on an air feed flow rate of 20,000 standard cubic meters per hour at a pressure of 6.5 bara and a temperature of 5° C. The air feed is assumed to contain 350 ppm carbon dioxide and has a relative humidity of 100%. The vessels are designed to operate on the following cycle: Adsorption-288 min.; Heating-90 min.; Cooling-178 min.; Changeover-20 min. The flow patterns during the adsorption and regeneration steps for the cases are as follows: Cases 1 and 2-upflow for adsorption, downflow for regeneration; Cases 3-5-downflow for adsorption and upflow for regeneration. Details of the designs are set forth in the Table 1. Regeneration of the adsorbent in the beds is carried out using dry carbon dioxide-free nitrogen at near atmospheric pressure at the temperatures and flow velocities specified in Table 1.

TABLE 1

| Case | 1 | 2 | 3 | 4 | 5 |
|---|---|---|---|---|---|
| No. of Layers | 2 | 2 | 3 | 3 | 3 |
| Ads. Part. Size, mm | 3/3 | 1.5/1.5 | 1.5/3/6 | 6/3/1.5 | 6/3/1.5 |
| Bed ID, m | 2.05 | 2.54 | 2.54 | 1.69 | 1.69 |
| Bed Height, m | 1.63 | 0.92 | 0.92 | 1.92 | 1.92 |
| Ads Vel., m/sec | 0.25 | 0.16 | 0.16 | 0.37 | 0.37 |
| Regen. Vel. m/sec. | 0.28 | 0.18 | 0.18 | 0.37 | 0.50 |
| Reg. Gas Temp, °C. | 150 | 150 | 150 | 150 | 100 |
| Ads $\Delta$ P, mbar | 54 | 32 | 29 | 62 | 62 |
| Regen. $\Delta$ P, mbar | 17 | 18 | 15 | 11 | 18 |
| % Fluidization[1] | 70 | 70 | 70 | 77 | 103 |
| % Fluidization[2] | 70 | 70 | 70 | 24 | 34 |

[1] % of minimum fluidization velocity, smallest particle size
[2] % of minimum fluidization velocity, particles in top bed In Table 1, where two layers are indicated each layer is a carbon dioxide adsorbent, and when three layers are indicated the top layer is a desiccant and the second and bottom layers are carbon dioxide adsorbent. The adsorbent particle size row states the particle size of the adsorbent in each layer, with the first number being the particle size of the adsorbent in the uppermost layer, the second number being the particle size of the adsorbent in the second layer and the third number (Cases 3-5) being the size of the adsorbent in the lowermost layer.

To achieve the desired result in Case 1, in which the bed contains two layers of adsorbent having a particle size of 3 mm, it will be necessary for the bed to have an internal diameter of 2.05 m and a bed height of 1.63 m. At this height and diameter the maximum allowable upflow velocity is 0.25 m/sec. In Case 2, in which the bed contains two layers of 1.5 mm particle size adsorbent, and in Case 3, in which the bed contains three beds and the size of the adsorbent in the uppermost layer is 1.5 mm, a bed height of 0.92 m will be necessary, but the bed diameter must be increased to 2.54 m to avoid a higher approach to fluidization. In Cases 4 and 5, in which the same layers as in Case 2 are used but in reverse order, a bed height of 1.92 m will be necessary, and the internal diameter of the bed will be only 1.69 m. Furthermore, a significant increase in feed velocity can be tolerated in the system of Case 4 than in any of the other three cases. This is because the larger particle sized adsorbent sits on top of the smaller particle sized adsorbent. Since the controlling factor in the cost of the system is the bed diameter, the cost of the Case 4 system will be much lower than the cost of the other three systems. Case 5 shows another advantage of the invention. In case 5 a lower bed regeneration temperature (100° C.) is used. The regeneration velocity required to regenerate the bed at 100° C. is 0.5 m/sec. This velocity is over the minimum velocity of the particles in the lowest bed (103%) but is well under the minimum fluidization velocity of the particles in the top bed (34%).

Experiments were carried out using a 100 mm diameter bed with different bed configurations to determine the fluidization velocities for various configurations. The results are given below. The particle sizes in Table 2 refer to average particles sizes.

TABLE 2

| Case | Bed Configuration | Fluidization Velocity m/s |
|---|---|---|
| 1 | 10", 6 mm AA layer | 1.28 |
| 2 | 10", 3 mm 13X layer | 0.70 |
| 3 | 10", 1.5 mm 13X layer | 0.47 |
| 4 | 2" (top layer) of 6 mm AA 8" (bottom layer) of 1.5 mm 13X | 0.82 |
| 5 | 2" (top layer) of 6 mm AA 6" (middle layer) of 3 mm 13X 2" (bottom layer) of 1.5 mm 13x | 0.93 |

As can be seen from Table 2, by putting the large particle adsorbent on top of the small particle adsorbent, the fluidization velocity for the bed is higher than the fluidization velocity for the small size adsorbent (compare case 3 with cases 4 and 5). However, the overall fluidization velocity is lower than the fluidization velocity of the largest size particles in the system (compare case 1 with cases 4 and 5).

Although the invention has been described with particular reference to specific equipment arrangements and to specific experiments, these features are merely exemplary of the invention and variations are contemplated. The scope of the invention is limited only by the breadth of the appended claims.

What is claimed is:

1. A cyclical process for the separation of a first component of a gas mixture from a second component of the gas mixture comprising the steps:

(a) passing said gas mixture at superatmospheric pressure downwardly through an adsorption vessel having at least two layers of particulate adsorbent, including a first layer of first component-selective adsorbent and, positioned below said first layer, a second layer of first component-selective adsorbent, the average particle size of adsorbent in said first layer being greater than the average particle size of adsorbent in said second layer, and withdrawing first component-depleted gas from said vessel at or near its bottom; and (b) passing a first component-lean purge gas upwardly through said vessel at a linear velocity between the minimum fluidization velocity of the adsorbent in the uppermost layer of adsorbent in said vessel and the minimum fluidization velocity of the adsorbent in said second layer; and withdrawing first component-enriched gas from said vessel at or near its top.

2. The process of claim 1, wherein said first layer of adsorbent is the uppermost layer in said vessel.

3. The process of claim 1, wherein said cyclical process is TSA.

4. The process of claim 3, wherein said gas mixture is air and said first component is carbon dioxide.

5. The process of claim 4, wherein the adsorbent in said first and second layers is a zeolite.

6. The process of claim 4, wherein said vessel contains a layer of moisture-selective adsorbent positioned above said first layer of adsorbent.

7. The process of claim 6, wherein said moisture selective adsorbent is silica gel, alumina, zeolite 3A or mixtures of these.

8. The process of claim 7, wherein the adsorbent in said first and second layers is zeolite 5A, zeolite 13X, calcium-exchanged type X zeolite or mixtures of these.

9. The process of claim 6 carried out in a plurality of adsorption vessels operated out of phase such that step (a) is carried out in one adsorption vessel while step (b) is being carried out in another vessel.

10. The process of claim 9, wherein substantially all of the adsorbent in said first layer of adsorbent has a particle size in the range of about 2 to about 10 mm and substantially all of the adsorbent is said second layer of adsorbent has a particle size in the range of about 1 to about 5 mm.

11. The process of claim 10, wherein substantially all of the moisture-selective adsorbent has a particle size in the range of about 2 to about 12 mm.

12. The process of claim 11, wherein during step (b) said first component-lean purge gas is passed through said vessel at a linear velocity in the range of about 0.1 to about 1 meter per second.

13. The process of claim 9, wherein substantially all of the moisture-selective adsorbent has a particle size in the range of about 5 to about 8 mm, substantially all of the adsorbent in said first layer of adsorbent has a particle size in the range of about 2 to about 6 mm and substantially all of the adsorbent is said second layer of adsorbent has a particle size in the range of about 1 to about 3 mm.

14. The process of claim 1, wherein the adsorbent in said first layer of first component-selective adsorbent and the adsorbent in the lower layer of first component-selective adsorbent are the same adsorbent.

15. The process of claim 1, wherein said pressure is in the range of about 2 to about 20 bara.

16. The process of claim 1, wherein the particle size of the adsorbent in the uppermost layer of adsorbent in said vessel is at least 120% the particle size of the adsorbent in said second layer.

17. The process of claim 1, wherein said adsorption vessel is a vertical adsorption vessel.

* * * * *